United States Patent [19]
Vasques et al.

[11] Patent Number: 4,587,777
[45] Date of Patent: May 13, 1986

[54] DEPLOYABLE SPACE TRUSS BEAM

[75] Inventors: Anthony J. Vasques; Raymond F. Crupi, both of San Diego, Calif.

[73] Assignee: General Dynamics Corporation/Convair Div., San Diego, Calif.

[21] Appl. No.: 681,352

[22] Filed: Dec. 13, 1984

Related U.S. Application Data

[63] Continuation-in-part of Ser. No. 310,194, Oct. 9, 1981, abandoned.

[51] Int. Cl.$^4$ .................................... E04H 12/18
[52] U.S. Cl. ............................... 52/108; 52/121; 52/632; 52/645; 343/880; 244/173
[58] Field of Search ............... 52/108, 109, 111, 121, 52/632, 645, 648, 646, 741; 343/880, 881; 182/40, 41; 244/167, 173

[56] References Cited

U.S. PATENT DOCUMENTS

| | | | |
|---|---|---|---|
| 3,486,279 | 12/1969 | Webb | 52/646 |
| 3,564,789 | 2/1971 | Vyvyan et al. | 52/646 |
| 3,593,481 | 7/1971 | Mikulin | 52/632 |
| 3,783,573 | 1/1974 | Vaughan | 182/152 |
| 4,116,258 | 9/1978 | Slysh et al. | 160/213 |

*Primary Examiner*—James L. Ridgill, Jr.
*Attorney, Agent, or Firm*—John R. Duncan; H. F. Mohrlock

[57] ABSTRACT

A deployable truss structure particularly adapted to space applications which has high structural efficiency, packages in a volume efficient manner and can be remotely deployed in a controlled, sequential manner. The truss in its deployed configuration exhibits a "diamond" cross section. Each of the four sides of the structure is essentially a "Warren" truss. Diagonals on the opposite sides of each diamond incorporate a mid-span hinge and the other two diagonals are rigid tubes. When packaged, all elements of the truss are folded so that they are parallel to one another and contained between two guide rails. The guide rails are located on either side of the diamond truss. The horizontal strut connection points or nodes are fitted with rollers that are locked in the guide rails for movement therealong. At the start of deployment the upright truss members are lifted to the vertical position, forming the basic diamond shape of the truss. A traveling mechanism on each guide rail unlocks the node of the first truss bay and carries it to its deployed length. Sequentially, the traveling mechanism returns to the next node, unlocks it, and deploys each next bay. As the truss grows, the bays are cantilevered beyond the guide rails. This truss is useful in remotely assembled large phased array space antennas, spacing a number of communication antennas from a common hub, etc.

12 Claims, 10 Drawing Figures

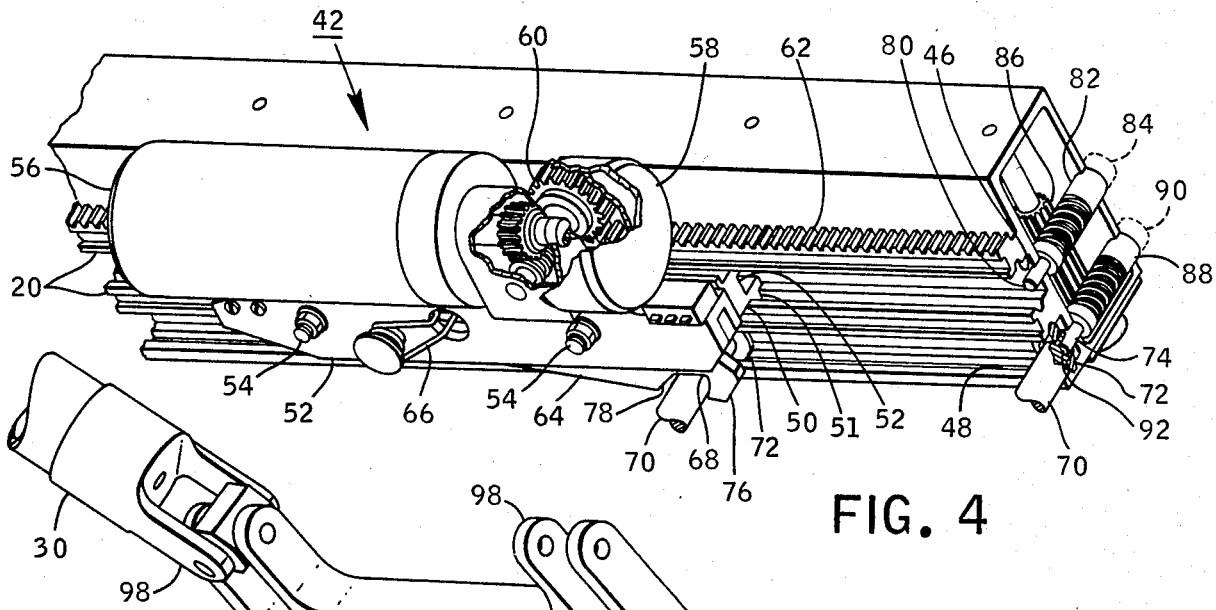
FIG. 4
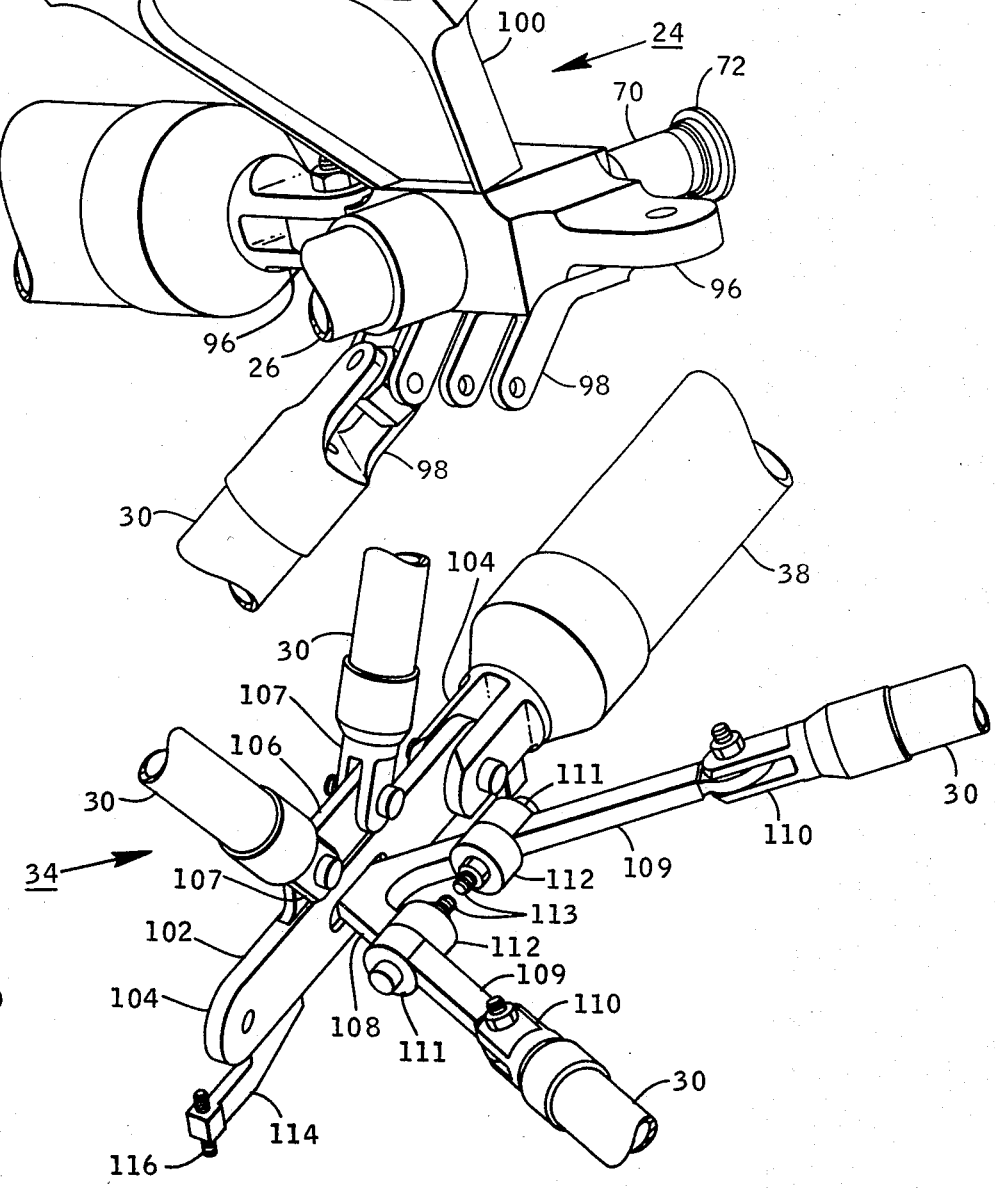
FIG. 5
FIG. 6

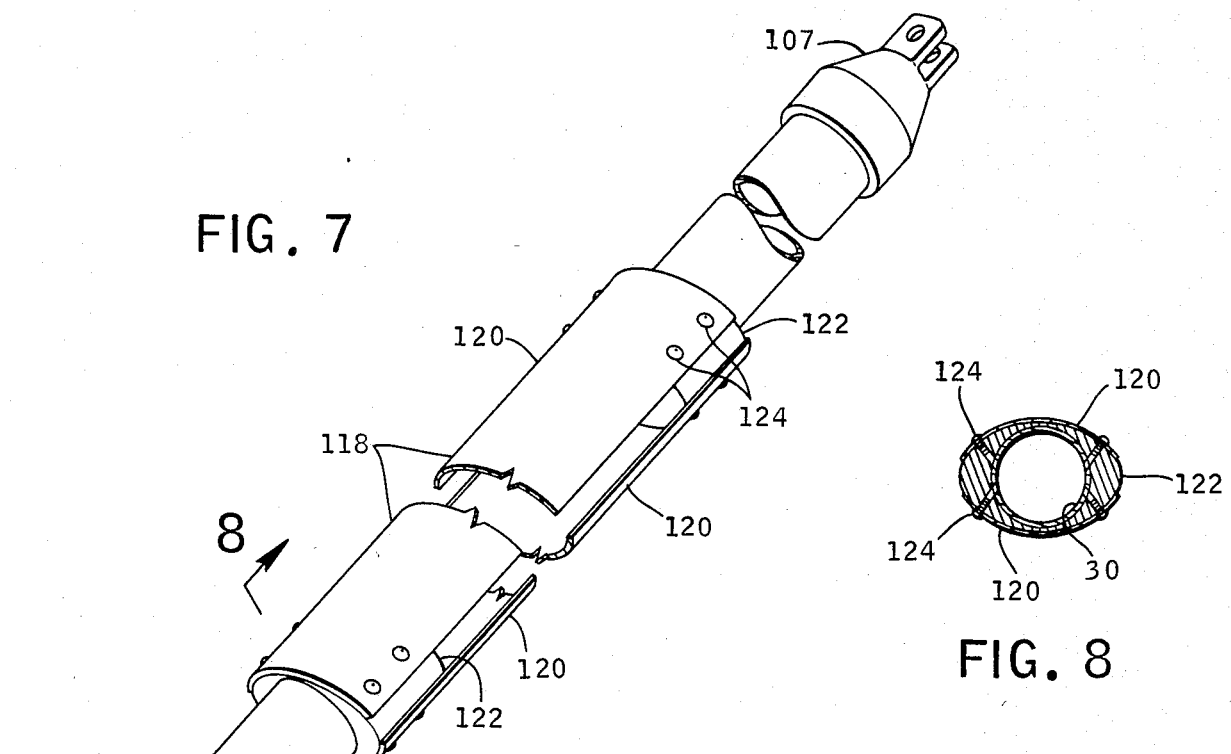
FIG. 7
FIG. 8
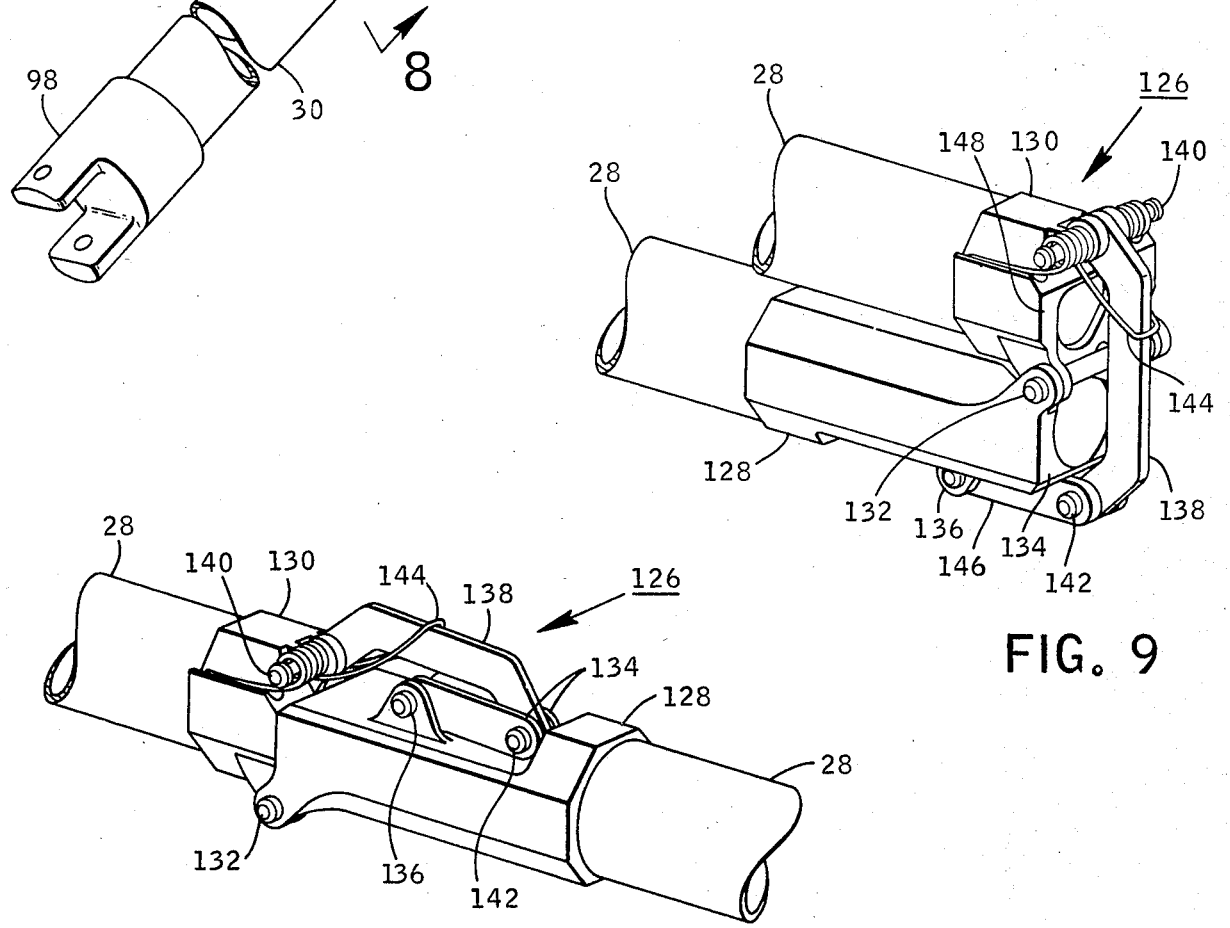
FIG. 9
FIG. 10

DEPLOYABLE SPACE TRUSS BEAM

CROSS-REFERENCE TO RELATED APPLICATION

This application is a continuation-in-part of copending U.S. patent application Ser. No. 310,194, filed Oct. 9, 1981 now abandoned.

BACKGROUND OF THE INVENTION

This invention relates in general to truss structures, and more particularly, to remotely deployable truss structures adapted to space applications.

A variety of expandable or deployable structures have been designed for specific space applications, such as the solar panel deployment system described in U.S. Pat. No. 4,116,258 and the parabolic antenna structure described in U.S. Pat. No. 3,783,573. While these structures have been very effective in meeting specialized needs, requirements are developing for long, truss beam like structures. For example, crowding of available orbital slots for communication satellites at geosynchronous altitude could be decreased if a number of such satellites were mounted at the ends of beams extending from a common hub in a "spider" like arrangement. Long beams also would be useful in a very large solar panel assemblies, large phased array antennas, etc.

Presently, large space structures can be erected in space through one or a combination of three techniques. Components (e.g., struts, nodes) can be launched into orbit and assembled by astronauts working outside. Deployable structures can be folded and retracted into a small volume, carried into orbit, then deployed to the final configuration. Or, beams can be fabricated in space from coils or reels of raw materials.

Each of these large space structure assembly techniques has limitations. Astronaut assembly from small components is obviously time consuming and may be dangerous. On-orbit manufacture requires a large and expensive space based manufacturing facility and is only feasible for very large structures. In the past, deployable structures have been limited by the high ratio of stored volume to deployed volume which limited the size of the structure which could be produced. Also, automatic uncontrolled deployment, such as by springs, was susceptible to jams and other mechanical hang-ups which often prevented full deployment.

Deployable beams, with a sufficiently high packing ratio and means for simple, controllable deployment would meet many space structures needs, especially in the geosynchronous communication satellite area.

Thus, there is a continuing need for improvements in deployable beams for space applications to overcome the above-noted problems.

SUMMARY OF THE INVENTION

The above problems, and others, are overcome by a deployable truss beam assembly movable from a first or packed position where certain of the struts making up the truss are folded at about their midpoint in such a way to permit the assembly to be packed in a tight, flat arrangement to a second or deployed position in which the struts are extended between node fittings to form a diamond truss in cross section. The assembly basically comprises a pair of spaced substantially parallel guide rails, attached at one end to a suitable base structure, such as a satellite hub, a mount in a space shuttle cargo bay, etc. Horizontal node fittings are arranged to ride along the inner sides of the guide rails. Side longitudinal struts extend between adjacent horizontal node fittings along the rails and cross struts extend across the guide rails to opposite nodes. Diagonal struts extend above and below the guide rails from horizontal nodes to upper and lower nodes, while upper and lower longitudinal struts extend between adjacent upper and lower node fittings. All longitudinal and cross struts and half of the diagonal struts have hinge means at about their midponts to allow those struts to fold about 180° during movement between deployed and packed arrangements.

When the deployment sequence begins, the struts are folded into a flat pack between the guide rails, with all struts substantially parallel to each other and substantially perpendicular to the guide rails. Initially the flat pack is positioned against the space vehicle. An actuator moves the pack to a position extending outwardly from the side of the space vehicle. A deployment arm mechanism, which could be mounted on the assembly hub or could be the space shuttle remote manipulator arms, first raises and lowers the upper and lower node fittings, respectively, to unfold the folded diagonal struts and extend the rigid diagonal struts. A suitable deployment arm mechanism is described in detail in copending U.S. patent application Ser. No. 310,195, filed Oct. 9, 1981, filed concurrently herewith. A tight, diamond shaped stack results. Next a traveling mechanism on each guide rail unlocks the first horizontal nodes and moves them along the guide rails to extend the folded longitudinal struts and form the first truss bay. The traveler then returns to the second set of horizontal nodes, unlocks them and moves them along the guide rails to open the second bay and move the already deployed first bay toward the end of the guide rails. Sequentially, the remaining bays are deployed and the truss structure is cantilevered beyond the guide rails.

During the deployment process, the traveler deployment means can be operated at varying rates and can be stopped or started at any time to allow for a carefully controlled sequence of operations and to provide opportunity for inspection and/or verification of operations. The truss structure is redundant in that a failure of any of its members will still provide a stable truss. For operations in space, this features allows the repair or replacement of a member to be made before continuing the deployment sequence. The truss can be deployed on Earth, adjusted as detailed below, then packed for launch into space with correct deployment and final configuration assured.

BRIEF DESCRIPTION OF THE DRAWINGS

Details of the invention, and of a preferred embodiment thereof, will be further understood upon reference to the Drawing, wherein:

FIG. 4 is a perspective view, partially cut-away of a deployment traveler mechanism;

FIG. 5 is a perspective view of a horizontal node fitting;

FIG. 6 is a perspective view of an upper/lower node fitting;

FIG. 7 is a perspective view of a "carpenter's" hinge;

FIG. 8 is a section view taken on line 8—8 in FIG. 7;

FIG. 9 is a perspective view of an over-center hinge in the folded or packed position; and FIG. 10 is a perspective view of an over-center hinge in the unfolded or deployed position.

DETAILED DESCRIPTION OF THE INVENTION

Figure 1:
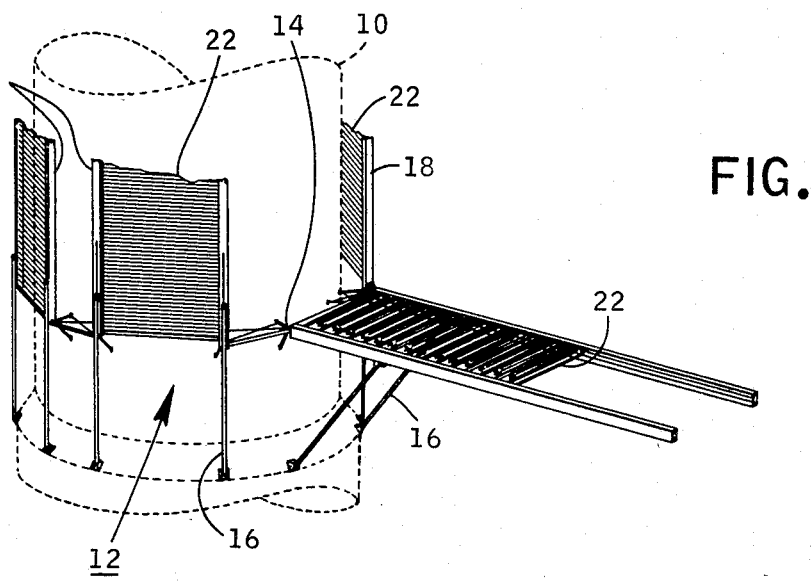
FIG. 1 is a schematic perspective view of packed truss assemblies mounted on a space vehicle, with one assembly ready for deployment.

Referring now to FIG. 1, there is seen a schematic representation of a space vehicle 10 acting as a hub or support for a plurality of stored deployable truss assemblies 12. One truss assembly 12 is shown extended outwardly from the side of space vehicle 10, supported by hinges 14 and actuator 16 in a conventional manner. Truss assemblies 12 can be moved from the stored position to the extended position by any suitable mechanism, such as telescoping electro-mechanical actuator 16 or by the remote manipulator arms built into the cargo bay of a Space Shuttle (not shown) which carried space vehicle 10 into orbit.

Thus, assembly 12 as seen in FIG. 1 includes a pair of substantially parallel guide rails 18. The inner surface of each rail 18 includes a guide means 20, as detailed below. The packed struts 22, most of which are folded (with certain rigid struts, as described below) is packed in to the space between guide rails 18. The guide rails thus serve as a load restraint device to protect the truss members and react shuttle launch loads.

Figure 2:
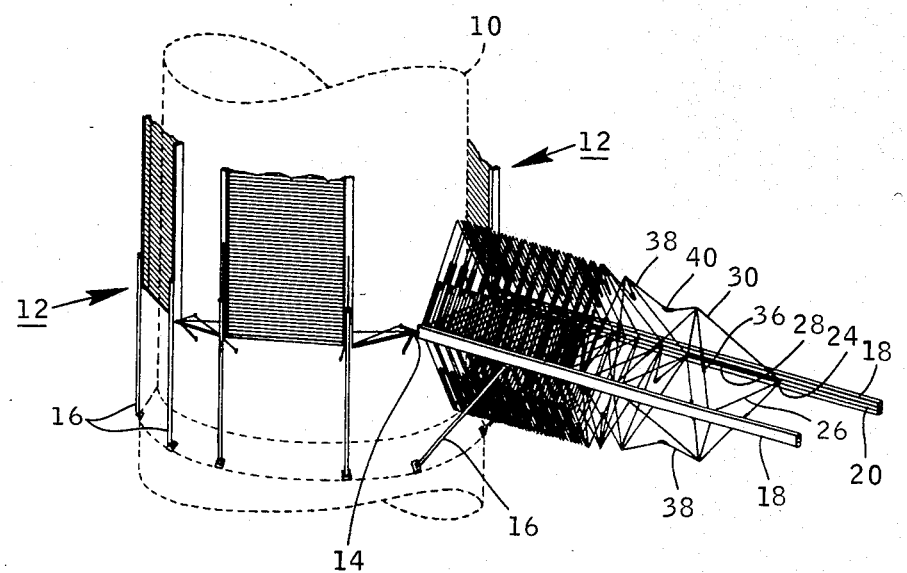
FIG. 2 is a schematic perspective view of the truss assembly with the first bay deployed and the second bay in the course of deployment.

The next step in the deployment sequence, the erection of the diagonal struts, is schematically illustrated in FIG. 2. A plurality of horizontal node fittings 24 (detailed in FIG. 5) are arranged along the inside of each guide rail 18. Cross struts 26 extend across between opposite horizontal node fittings 24. Side longitudinal struts 28 extending between adjacent horizontal node fittings 24 are folded about a hinge 29 at their midpoints in pack 22. Diagonal struts 30 extend upwardly and downwardly from horizontal node fittings 24 to upper and lower node fittings 32, respectively. Some of the diagonal struts have hinges 36 at their midpoints to allow folding for packing. In a preferred arrangement, looking from the end of the pack, the diagonals on two oppostie sides of the diamond truss formed by the diagonal strut 30 have hinges, while those on the other two opposite sides do not. Upper and lower longitudinal struts 38 have hinges 40 near the midpoints of struts 38 allow them to fold for packing. When packed, the folded struts have the strut portions adjacent the hinges in a substantially parallel arrangement as seen in the left side stack portion in FIG. 2.

Figure 3:
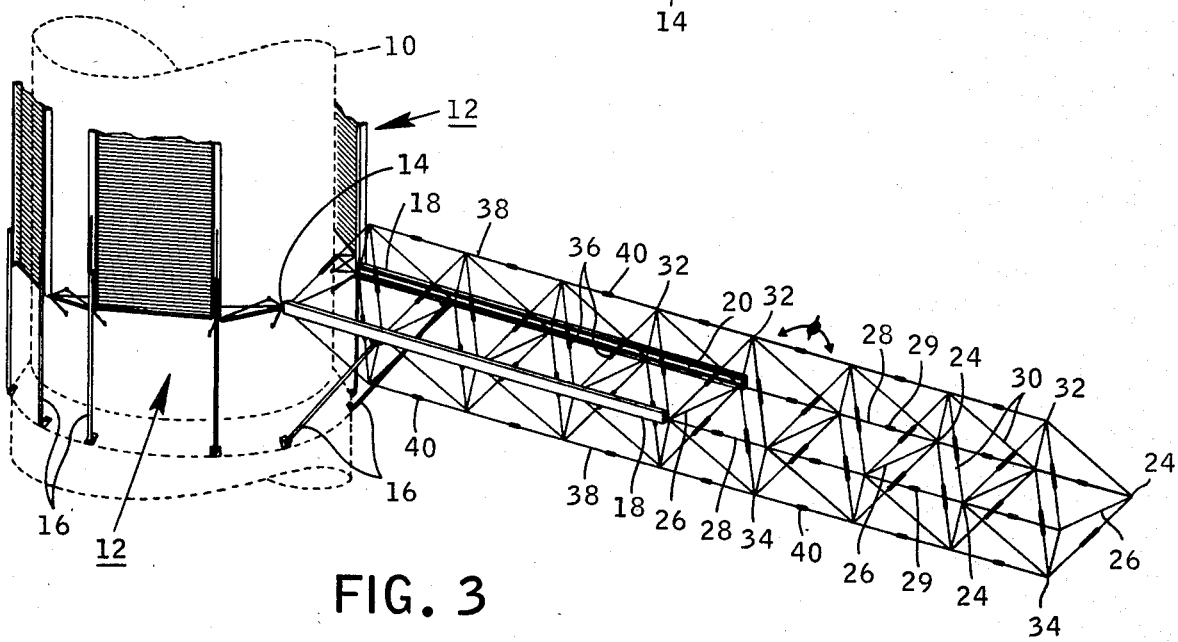
FIG. 3 is a schematic perspective view of an eight-bay truss fully deployed.

A traveler release mechanism 42 (not shown in FIG. 1-3 for clarity but detailed in FIG. 4 and described below) on each guide rail is actuated after diagonal struts 30 are erected. A traveler 42 engages the outermost horizontal node fitting 24 on each side and moves it toward the end of the guide rails 18, causing the longitudinal struts 28 and 38 to unfold, forming the first truss bay. When the first bay is fully deployed (and latched in place by the over center hinges shown in FIG. 9 and 10 and described below), traveler 42 releases the first pair of horizontal node fittings 24 and moves back along guide mean 28 on guide rails 18 to engage and unlock the second pair of horizontal nodes fitting 24. As the second pair of fitting 24 is moved toward the open end of guide rails 18, the second truss bay unfolds and the first bay is moved the corresponding distance. When the trusses are unfolded, the portions adjacent the hinge lie in substantially straight lines as seen in FIG. 3. Thus, the truss portions gradually swing through an arc of about 180° from the folded position at the left side of the stack in FIG. 2, through an intermediate angle as seen at the right side of the stack in FIG. 2, to the straight line seen in FIG. 3. This approximately 180° swing of the truss portions is illustrated as arc $\phi$ in FIG. 3.

The deployment of succeeding truss bays continues until the entire assembly is extended as seen in FIG. 3. While an eight-bay truss is illustrated for simplicity, a much longer truss could be similarly deployed. As seen, most of the truss assembly extends beyond guide rails 18, since the primary strength of the assembly is in the truss arrangement, the guide rails being merely a deployment means. Once all of the truss assemblies 12 on space vehicle 10 have been deployed, additional structure may be attached thereto as described. For example, suitable antenna fabric may be attached to the truss assemblies to produce a very large phased array antenna. Or, communication devices may be attached to the ends of trusses as desired. Of course, such devices could have been attached to the first bay prior to truss deployment, if desired.

Details of traveler 42, the mechanism or node deployment means which moves the horizontal node fittings 24 from the packed position of FIG. 2 to the deployed position on FIG. 3 are provided in FIG. 4. Guide means 20 on the inner side or guide rail 18 includes an upper guideway 46 and a lower guideway 48. Node release cam block 50 has outwardly extended flanges 51 which ride in upper guideway 46. A support member 52 is fastened to cam block 50 by bolts 54. A reversible variable-speed motor 56 and assorted gear box 58 are mounted on support member 52. Motor 56 drives a pinion gear 60 which engages rack 62 to move traveler 42 along rail 18. The forward or open end of guide rail 18 is to the left as seen in FIG. 4. Each support member carries a node latch lever 64 which is biased downwardly by a torsion spring 66. A notch 68 in latch lever 64 is adapted to engage a tubular extension 70 between the body of horizontal node fitting 24 and a roller 72 which rides in lower guideway 48.

In the strut packed arrangement, the end of each horizontal node fitting extension 70 is held or locked in place by a pin 74. As traveler 42 moves latch lever 64 toward a node extension 70, the angled face 76 of lever 52 rides up and over the extension until notch 68 drops down over the extension 70 under the urging of spring 66. Motor 56 is then reversed to move node extension 70 (and the truss members attached thereto, as described above) to the deployed position. When the extended position is reached, motor 56 can again be reversed, manually or under computer control. Alternately, a conventional sensor can be incorporated in traveler 42 to sense resistance to further movement and reverse motor 56. As traveler 42 begins to move to the right, as seen in FIG. 4, the sloping back wall 78 of notch 68 permits lever 52 to ride up over extension 70, thereby releasing or unlocking the node fitting. As lever 52 reaches the next node extension 70, illustrated at the right end of FIG. 4, face 76 permits lever 52 to cam up over extension 70 to bring notch 68 into engagement therewith. At the same time a wedge-like cam surface 53 inside cam block 50 presses on pin 80, moving rod 82 into the position schematically illustrated by broken lines 84. The circular grooves or teeth on rod 82 operate as a rack gear engage and rotate a pinion gear member 86. Pinion gear member 86 similarly engages grooves on a rod 88, moving it to the position schematically illustrated by broken lines 90, withdrawing pin 92 from the end of node extension 70, releasing the node for deployment. Thus, the horizontal nodes are sequentially released and moved from the stored state to full deployment.

Further details of horizontal node fitting 24 are provided in FIG. 5. The node is basically supported by the cross-strut 26 which extends across to the corresponding opposite node and is arranged in a straight line with extension 70 and guide roller 72. Side longitudinal struts 28 are connected through a simple fitting 96 which permits rotation about a line perpendicular to the plane of the guide rollers to permit side longitudinal struts 28 to move from the inwardly folded position to the deployed position parallel to the guide rollers. Diagonal struts 30 are connected through universal joints 98 to permit movement in one plane during initial erection of the diagonals (FIG. 2) followed by extension of the truss (FIG. 3). As shown in FIG. 3, on one side of the truss the upper diagonal struts 30 are hinged at their mid-points while the lower diagonal struts are rigid, with the other side reversed. For optimum packing density, we have found that the fittings 98 carrying fixed diagonal struts should be spaced slightly further from the node than those carrying hinged diagonal struts. Therefore, a short flange 100 between fittings 98 carrying fixed diagonal struts 30 is preferred. Typically, with diagonal struts having lengths of 4 to 6 feet, flange 100 will displace fittings 98 2 to 6 inches. Node fittings 24 on opposite sides of the truss are identical, the nodes on one side merely being inverted with respect to those on the other. This node fitting 24 has been found to be strong, compact and to aid in rapid, consistent truss deployment.

Details of the upper and lower node fittings 32 and 34 are illustrated in FIG. 6. While fittings 32 and 34 are identical, a lower fitting 34 is shown for convenience of illustration. The basic node flange 102 includes two simple, one plane of rotation, end fittings 104 for connection to lower longitudinal struts 38. A side flange 106 connects to fixed diagonal struts 30 truss fitting 107. A bifurcated side extension 108 is connected to links 109 through bases 112 on extension 108, bases 111 on links 109 and bolts 113. This permits relative rotation in a first plane about bolts 113 during deployment. Links 109 are connected to hinged diagonal struts 30 through fittings 110 to provide a second degree of freedom, with the plane of rotation of fittings 110 perpendicular to that around bolts 113. A vertical node stop means 114 is provided on flange 104 adjacent each longitudinal strut 38. Stop means 114 includes an adjustable set screw 116 which bears against the end portion of strut 38. During testing of the truss assembly on Earth prior to launch, the truss is deployed and set screw 116 is adjusted to assure that longitudinal struts 38 throughout the deployed truss lie along a straight line. Means 114 also provides fixity of the nodes; as struts 38 are loaded, the load is transferred through the stop means 114 to the node, reacting against the adjacent stop means 114 and strut.

A preferred hinge 36 for use in diagonal struts 30 is illustrated in FIGS. 7 and 8.

A typical hinged diagonal strut 30, including portions of end fittings 107 and 98 is shown. At about the midpoint of strut 30 is located or fastened a "carpenter" hinge 118. This hinge is called a carpenter hinge since it includes two opposed transversely curved strips 120 of springy, flexible metal which are similar to the elongated metal strip making up the conventional tape measure used by carpenters. A pair of eliptical or oval sleeves 122 are bonded over the ends of strut 30 and are fastened to strips 120 by any conventional means, such as screws 124. The carpenter hinge has several desirable features for this application. The strut may be folded from a straight line arrangement (FIG. 3) to one in which the strut portions adjacent the hinge are substantially parallel (FIG. 2, left portion of stack) or inherently about 180° many times without damage to the strips. The hinge is extremely simple with no relatively moving parts within the hinge to fail. During deployment, as the folded strut enfolds, the spring-like effect of the strips adds to a significant force aiding in straightening the strut. Also, this hinge acts as a "no-slop" lock-up joint.

Where greater load carrying capacity is desired, we prefer to use the over-center hinge 126 illustrated in FIG. 9 and 10. We have found the carpenter hinge to be extremely efficient in diagonal struts 30 (where great load-carrying capacity is not needed), but prefer the over-center hinge in longitudinal struts 28 and 38. FIG. 9 shows hinge 126 in the folded or stored position. Hinge 126 is located at substantially the midpoint of the longitudinal strut, here a strut 28. Hinge 126 consists of two sleevelike end fittings 128 and 130 which are bonded to the ends of tube 28. Fittings 128 and 130 pivot about pin 132. Two short straight links 134 are pivotably mounted at 136 on fitting 128. A bent link 138 is pivotably mounted on fitting 124 at pin 140, with its other end connected to links 134 at pin 142. A torsion spring 144 biases link toward links 134. In the folded position of FIG. 9, spring 144 tends to maintain the folded position, since initial unfolding forces link 138 outwardly against the spring force. As unfolding continues, links 134 pivot 180° about mount 136. As 90° pivot is passed, ("over-center") the force of spring 144 now is in the direction of deployment. Faces 146 and 148 of fittings 128 and 140, respectively, come into tight contact, assuring that the overall strut will be straight. This hinge 126 thus maintains strut 28 in the deployed position against severe side forces.

The novel deployable truss structure described above has high structural efficiency, is redundant, packages in a volume efficient manner and can be deployed in a sequential and easily controlled manner. Other applications, ramification and variation of this invention will occur to those skilled in the art upon reading this disclosure. Those are intended to be included within the scope of this invention, as defined by the appended claims.

We claim:

1. A deployable truss beam assembly movable between a tightly packed position and a deployed truss position comprising;
   a pair of substantially parallel guide rails having guide means on their opposed surfaces, said guide rails having a length less than the length of said truss beam in the deployed position and longer than the length of said truss beam in the packed position;
   a plurality of horizontal node fittings engaging said guide means for movement along and relative to said rails;
   side longitudinal struts connected to and extending between each adjacent pair of horizontal node fittings along each guide rail;

cross struts connected to and extending between corresponding horizontal node fittings on opposite guide rails;

upper and lower node fittings spaced above and below said guide rails along lines equidistant from both rails;

diagonal struts connected to and extending from said horizontal node fittings to connections at said upper and lower node fittings to form diamond trusses;

upper and lower longitudinal struts connected to and extending between adjacent pairs of said upper node fittings and between adjacent pairs of said lower node fittings;

hinge means inserted at approximately the midpoint of each of said side upper and lower longitudinal struts and half of said diagonal struts so that each of those struts may be folded inwardly from a substantially straight line arrangement to a fully folded arrangement where the portions of said strut adjacent to said hinge are substantially parallel when said truss is moved from a deployed to a packed arrangement where all of said struts and strut portions are substantially parallel to each other.

2. The truss beam assembly according to claim 1 wherein at least some of said hinge means comprise a pair of transversely curved elongated strips of spring metal which bridge a gap in said strut at substantially the midpont thereof, the ends of said strips secured to said strut with the concave strip faces juxtaposed.

3. The truss beam assembly according to claim 1 wherein at least some of said hinges are over-center hinges which lock when the strut is moved from the folded, packed position to the straight, deployed position.

4. The truss beam assembly according to claim 1 wherein at least some of said upper and lower nodes include an adjustable node stop means each adapted to adjust the relative angle between succeeding longitudinal struts fastened to that node and provide node fixity.

5. The truss beam assembly according to claim 1 further including releaseable locking means maintaining said horizontal node fittings in selected position along said guide rails in the packed arrangement with said struts and strut portions substantially parallel to each other and substantially perpendicular to said guide rails.

6. The truss beam assembly according to claim 5 further including traveler means adapted to engage said horizontal node fittings, release said locking means and move said fittings along said guide rails to the deployed position.

7. In a truss beam assembly movable between a tightly packed storage position and a deployed expanded truss position which comprises: a plurality of struts positioned in a flat pack arrangement between a pair of guide rails with at least some of said struts folded about their midpoint and at least some of said struts fastened to nodes locked to said guide rails in a closely packed storage position; and node deployment means comprising means for unlocking said nodes and moving them along said guide rail to a deployed position, the improvement wherein said node deployment means comprises:

node lock means including pins on said guide rails adapted to lockingly engage said nodes in the truss storage position;

pin release means adapted to selectively release said nodes;

traveler means adapted for movement along said guide rails;

activating means on said traveler for operating said pin release means;

node latch means on said traveler to connect said traveler to said node upon release of said pin and to carry said node as said traveler moves from the node stored position to the node deployed position; and node release means to disconnect said latch as said traveler returns from the fully deployed position of the first node toward the second stored node;

whereby repeated operation of said node deployment means sequentially moves all nodes to the truss deployed position.

8. The improvement according to claim 7 wherein each of said node locking means includes a first pin mounted on said guide rail for axial movement into and out of engagement with a hole in said node; circular grooves on said pin engaging an elongated pinion gear member; a second pin having circular grooves engaging said pinion gear and extending from said guide rails toward said traveler and a cam surface on said traveler adapted to engage said second pin for axial movement thereof, whereby as said cam moves said second pin axially, engaged second pin grooves cause said pinion gear member to rotate, thereby causing similar axial movement of said first pin to withdraw said first pin from the node hole to release said node for movement along said guide rail.

9. The improvement according to claim 8 wherein said traveler includes a reversible variable speed drive motor for driving a pinion gear in engagement with a rack along said guide rail; whereby said motor may be selectively operated to move said traveler in either direction along said rail.

10. The improvement according to claim 7 wherein said node latch means comprises a pivoted lever having a notch adapted to engage said node; spring means to maintain said notch in engagement with said node; a cam face on one end of said lever to permit the lever to slide up over said node as the traveler is moved toward said node and is moved into latching engagement therewith by said spring; and a sloping back wall on said notch adapted to release said node from said notch when the direction of traveler movement is reversed.

11. The method of deploying a truss structure which comprises:

providing a truss structure according to claim 1 with all of said hinged struts folded and arranged in a substantially flat pack between said guide rails;

moving the diagonal struts to the upright position by unfolding all hinges in said diagonal struts;

moving the end pair of horizontal nodes away from said pack along said guide rails to unfold the hinges in the longitudinal struts;

when the first set of longitudinal struts is fully unfolded to form a first truss bay moving the second set of horizontal nodes away from said pack to erect the second truss bay while continuing extension of the first bay;

continuing the sequential movement of horizontal nodes until the entire truss is erected and extended.

12. The method according to claim 11 including the further steps of unlocking a locking means between said horziontal node fittings and guide rails prior to moving said horizontal node fittings along said guide rails.

* * * * *